Dec. 31, 1968   A. O. BEER ET AL   3,418,849
VEHICLE TEST BED

Filed May 11, 1966   Sheet 1 of 5

INVENTORS
ARTHUR O. BEER
GARY H. KLING

BY

JOHN F. SCHMIDT
ATTORNEY

INVENTORS
ARTHUR O. BEER
GARY H. KLING

BY

JOHN F. SCHMIDT
ATTORNEY

United States Patent Office 3,418,849
Patented Dec. 31, 1968

3,418,849
VEHICLE TEST BED
Arthur O. Beer, Peoria, and Gary H. Kling, East Peoria, Ill., assignors to Westinghouse Air Brake Company, a corporation of Pennsylvania
Filed May 11, 1966, Ser. No. 549,317
11 Claims. (Cl. 73—117)

ABSTRACT OF THE DISCLOSURE

A test bed for a railway vehicle with four driven wheels on two parallel axles including four rail wheels rotatably mounted to support the driven wheels with each having a profile simulating a rail and an energy absorber drivingly connected to each rail wheel with the test bed being capable of simulating varying conditions encountered in the operation of the vehicle such as operation on a curve, passengers moving to one side of the vehicle, varying loads and a momentary dip in the track.

---

This invention relates to a vehicle test bed, especially to a test bed for a multi-axle truck to provide part of the mobile support for a railway vehicle.

There is a great deal of current interest in the problem of transporting large numbers of people at maximum speed, safety, and efficiency. This interest becomes more important than ever in view of the accelerated urbanization of populations, especially in the highly industrialized societies. The need to transport huge numbers of people quickly, safely, and efficiently requires new concepts in transportation techniques. This in turn means new design concepts and new structures in the equipment used to meet these needs.

Traditional designs of railway equipment have grown in size and speed with little or no change in basic designs, with the result that equipment which could be tolerated at a much slower pace is no longer satisfactory in terms of tolerable noise levels, safety margins, passenger comfort, equipment reliability, and probably other considerations. The new design concepts required to meet the many new or intensified considerations require test facilities which were not necessary heretofore, the pace of which requires more efficient testing techniques; more specifically, it no longer suffices to make the equipment and run it on a track for the traditional "seat-of-the-pants" reaction of the designers. What is needed is a new approach to testing which allows the application of laboratory techniques in the testing of full-scale models at operating speeds under controlled conditions which closely simulate the actual operating environment.

It is accordingly an object of this invention to provide a test bed for a railway car truck which allows the truck to "run" at operating speeds while the truck is stationary relative to the ground and to trained observers. It is a further object to provide test facilities which simulate the actual operating environment under closely controlled conditions. These and other objects are accomplished in a vehicle test bed having rail wheels to support the flanged vehicle wheels, the rail wheels having an end elevation profile which as nearly as possible duplicates the rail on which the vehicle wheel will operate.

The invention primarily concerns a test bed for a railway car truck having two parallel axles and two wheels on each axle. All the wheels, preferably, are driven, and drive is through a differential to permit the wheels on one side to run faster than the wheels on the other side when the truck rounds a curve. Such a truck is shown in Patent 3,244,116, issued to W. H. McGlade Apr. 5, 1966. Because the truck as such is not part of this invention, it is shown only in FIGS. 2 and 3 to illustrate the invention in operation, and in those two figures it is shown only in phantom.

Figure 2:
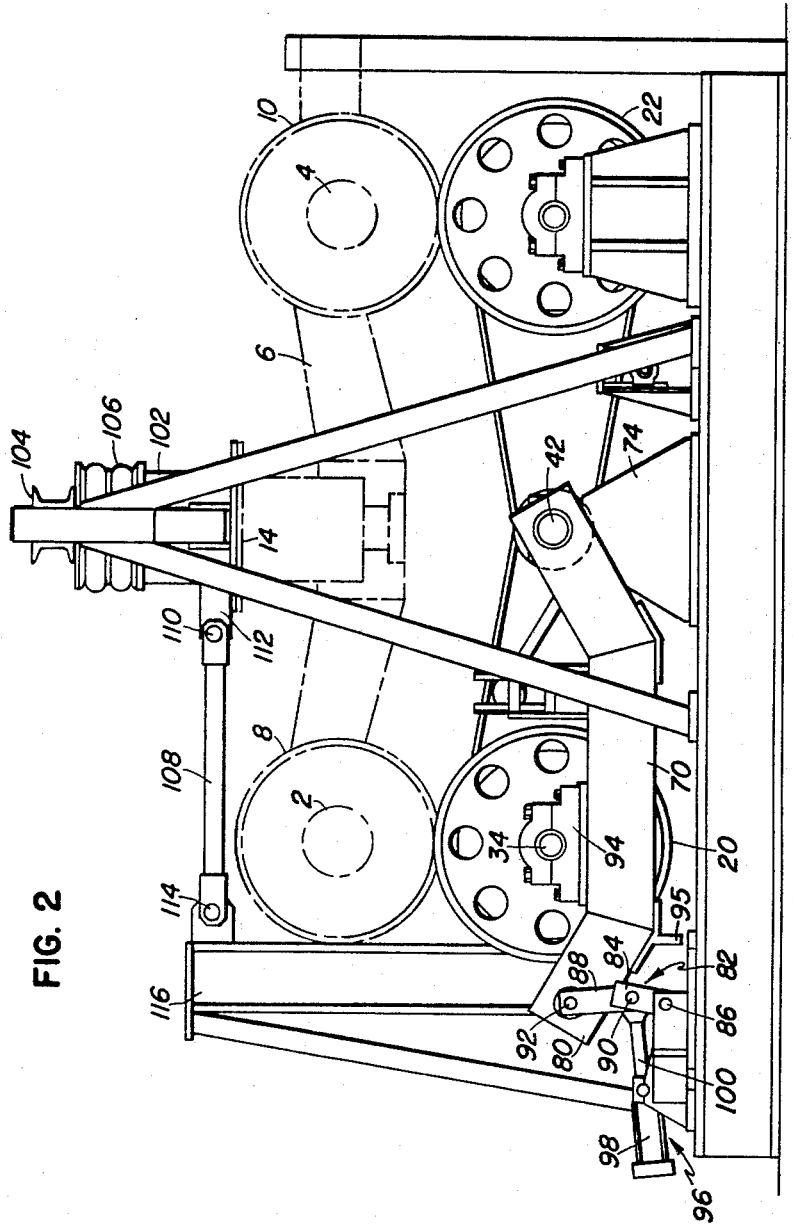
FIG. 2 is a side elevation view of the test bed shown in FIG. 1.
Figure 3:
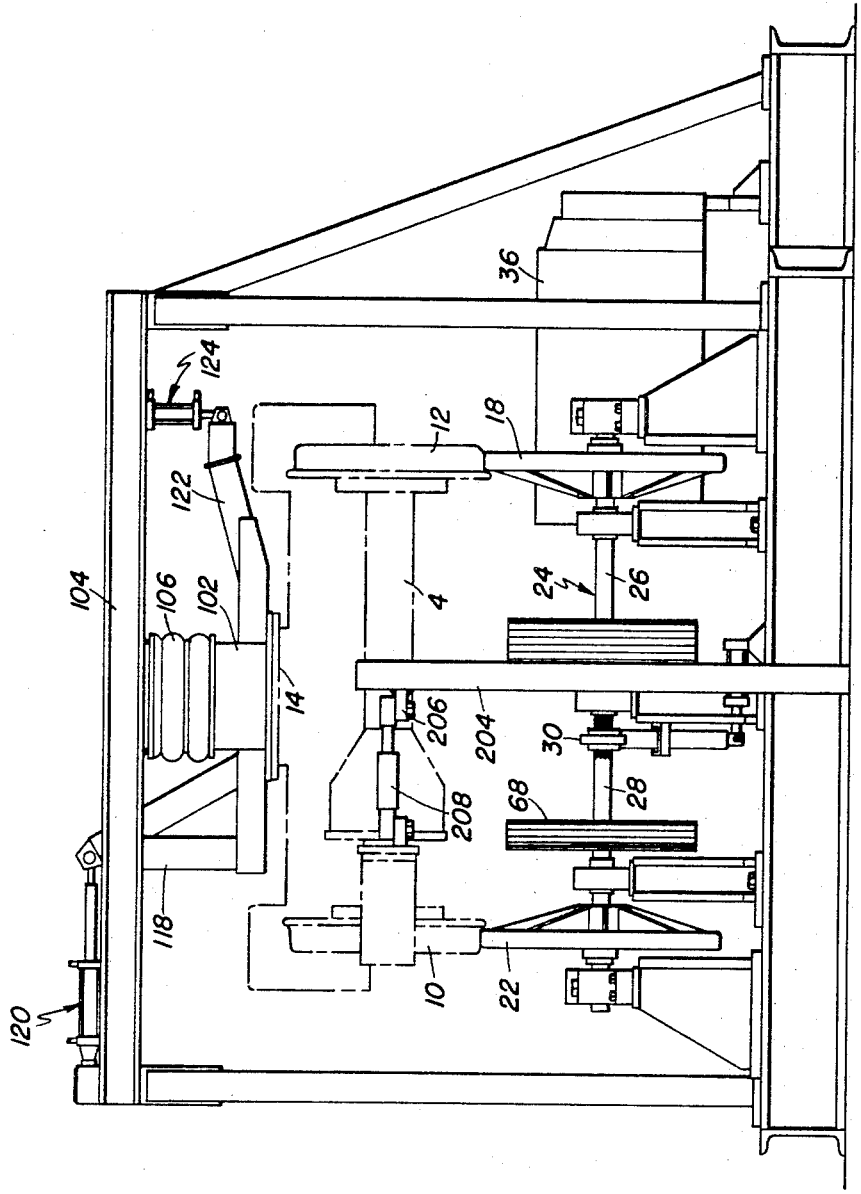
FIG. 3 is an end elevation view of the test bed shown in FIG. 2.

As shown in the above-identified patent, and as shown in phantom in FIGS. 2 and 3, an all-wheel drive truck of the type primarily contemplated for test by this invention consists of two axles 2 and 4 mounted in a frame structure 6. Substantially central to the flanged wheels, three of which are shown at 8, 10, and 12, a load-carrying pad 14 is suitably carried by the frame structure 6.

The rails on which the railway vehicle operates are simulated by four rail wheels; rail wheels 16 and 18 simulate one of the rails, and rail wheels 20 and 22 simulate the other rail. Each rail wheel has an end profile (FIG. 3) which closely resembles a type of rail on which the truck is to run. In the embodiment of the invention here shown, rail wheels 18 and 22 are mounted on and rotate with a two-part axle indicated as a whole at 24 and consisting of the two parts 26 and 28 connectible by a clutch 30. Rail wheel 16 rotates with its axle portion 32, and rail wheel 20 rotates with its axle portion 34.

To load the power source which drives the vehicle wheels, an energy absorber is connected with the rail wheels. The energy absorber may be a conventional dynamometer, or a hydraulic device which can be used as a pump or as a motor, or a dynamo-electric device which can be operated as a motor or as a generator, and so on. In some applications, it will be convenient to use an energy absorber which is reversible to be run as a source of torque, such as the hydraulic or electric motor referred to, so that the test bed can be used to test an unpowered vehicle.

In keeping with the foregoing, the embodiment of the invention here shown is illustrated as having an energy absorber 36 connected to a two-part shaft 38; the two parts 40 and 42 of the shaft are shown as connectible by a clutch 44. Pulleys 46, 48 on shaft part 40 are connected by drive belt systems 50, 52 with pulleys 54, 56 to establish driving connection with rail wheels 16, 18 respectively. Similarly, pulleys 58, 60 on shaft part 42 are connected by drive belt systems 62, 64 with pulleys 66, 68 to establish driving connection with rail wheels 20, 22 respectively. As will be appreciated by those skilled in the art, pulley 54 is secured to axle portion 32, pulley 56 is secured to the part 26 of two-part axle 24, pulley 66 is secured to axle portion 34, and pulley 68 is secured to the part 28 of two-part axle 24.

Pulleys 54, 56, 66 and 68 are substantially equal in diameter. Pulleys 46 and 48 are substantially equal in diameter, and pulleys 58 and 60 are substantially equal in diameter; however, pulleys 46, 48 are of a diameter that is different from the diameter of pulleys 58, 60, in order that shaft 38 through the resistance imposed by energy absorber 36, may permit rail wheels 16, 18 to run at a given speed and simultaneously permit rail wheels 20 and 22 to run at a different speed, to simulate operation of the test vehicle on a curve.

Figure 1:
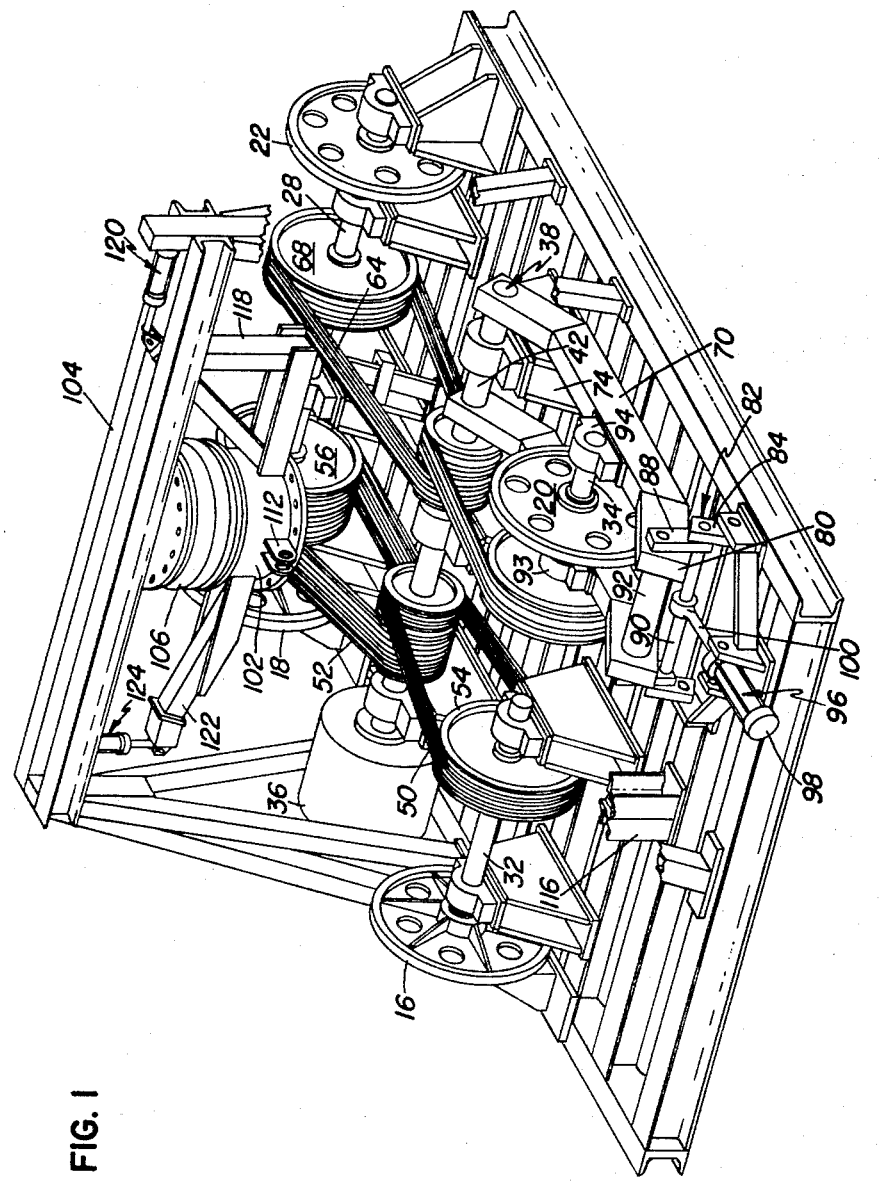
FIG. 1 is an axonometric view of a railway vehicle test bed made according to this invention.
Figure 4:
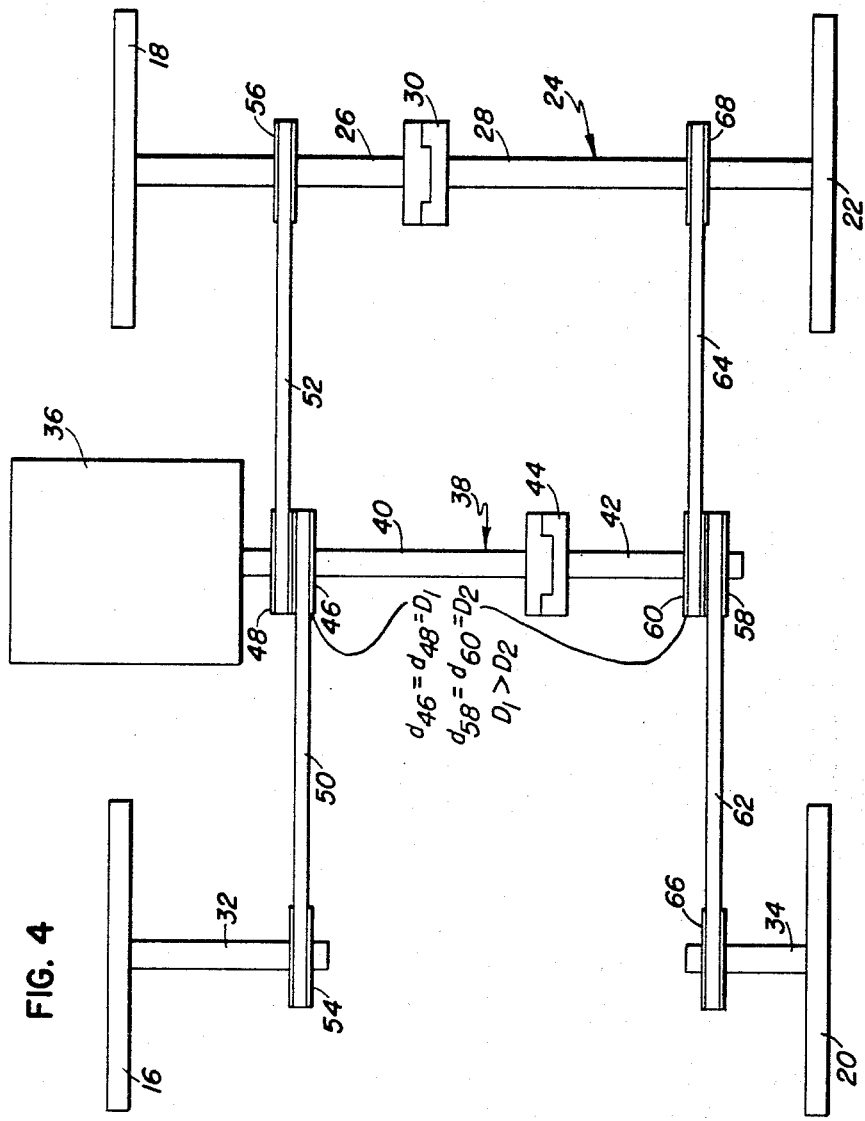
FIG. 4 is schematic, being a plan view of a simplified structure showing only the bare elements of the invention.

It will be understood by those skilled in the art that the multiple-belt drives shown in FIGS. 1–3 are illustrated schematically by single belts in the mechanical force diagram of FIG. 4, and of course the multi-sheave pulleys of the actual test device are illustrated in FIG. 4 as simple V pulleys. Shafts and axles are mounted for rotation in conventional bearings which need not be pointed out or detailed here.

To simulate irregularities in the track, shaft 34 of rail wheel 20 is mounted in bearings which can be shifted vertically. Thus, a support lever 70 is pivotally mounted on shaft part 42 of the two-part shaft 38. Shaft 38 is mounted for rotation in any suitable manner, as by pillow blocks supported on pedestals, one of which is shown at 74. The other end 80 of lever 70 is supported on a toggle linkage indicated generally at 82. Linkage 82 consists of base links 84 pivotally connected to the test bed frame at 86 and pivotally joined with lever links 88 at 90. Lever links 88 are pivotally secured to lever 70 at 92. Lever 70 carries pillow blocks 93 and 94, in which shaft 34 is rotatably mounted. A leg 95 on the under side of the movable end of lever 70 limits the amount of drop permitted in the vertical movement of lever 70.

The axis of shaft 34 is at maximum height when the three pivots 86, 90 and 92 are in a straight line. The alignment of the pivots is controlled in the preferred embodiment shown by a fluid motor device 96 comprising a cylinder-and-piston assembly, of which the cylinder is shown at 98. A piston (not shown in FIG. 2) reciprocates in the cylinder and is secured to a rod 100 which connects at its outer end to the pivot 90.

Reference was made above to a load-carrying pad 14 of the vehicle. Said pad is secured to a load-transfer device 102 in much the same way that the pad is secured in use to a railway car. Between device 102 and an overhead frame member 104 there is disposed a bellows 106 which can be expanded by air under pressure to bias transfer device 102 downward to load the vehicle truck.

Load transfer device 102 is stabilized in the direction of normal vehicle travel by a longitudinal stabilizer bar 108 which is pivotally secured at 110 to device 102 by means of a bracket 112, and at 114 to an upright frame member 116 of the test bed.

Bellows 106 is preferably flexible, and thus provides non-rigid support for device 102 from the under side of frame member 104. Device 102 carries a vertically-extending arm 118 to which a fluid motor 120 is secured so as to make possible the action of a force transverse to the direction of motion on the railway car to simulate a side load. The force is applied along a line passing through the appropriate center of the car.

A substantially horizontal arm 122 is also mounted on device 102 and extending transversely from device 102. A fluid motor 124 is arranged to apply an eccentric vertical load on device 102 to simulate a situation in which a large number of passengers move to one side of the car, as when the car approaches a station platform.

Figure 5:
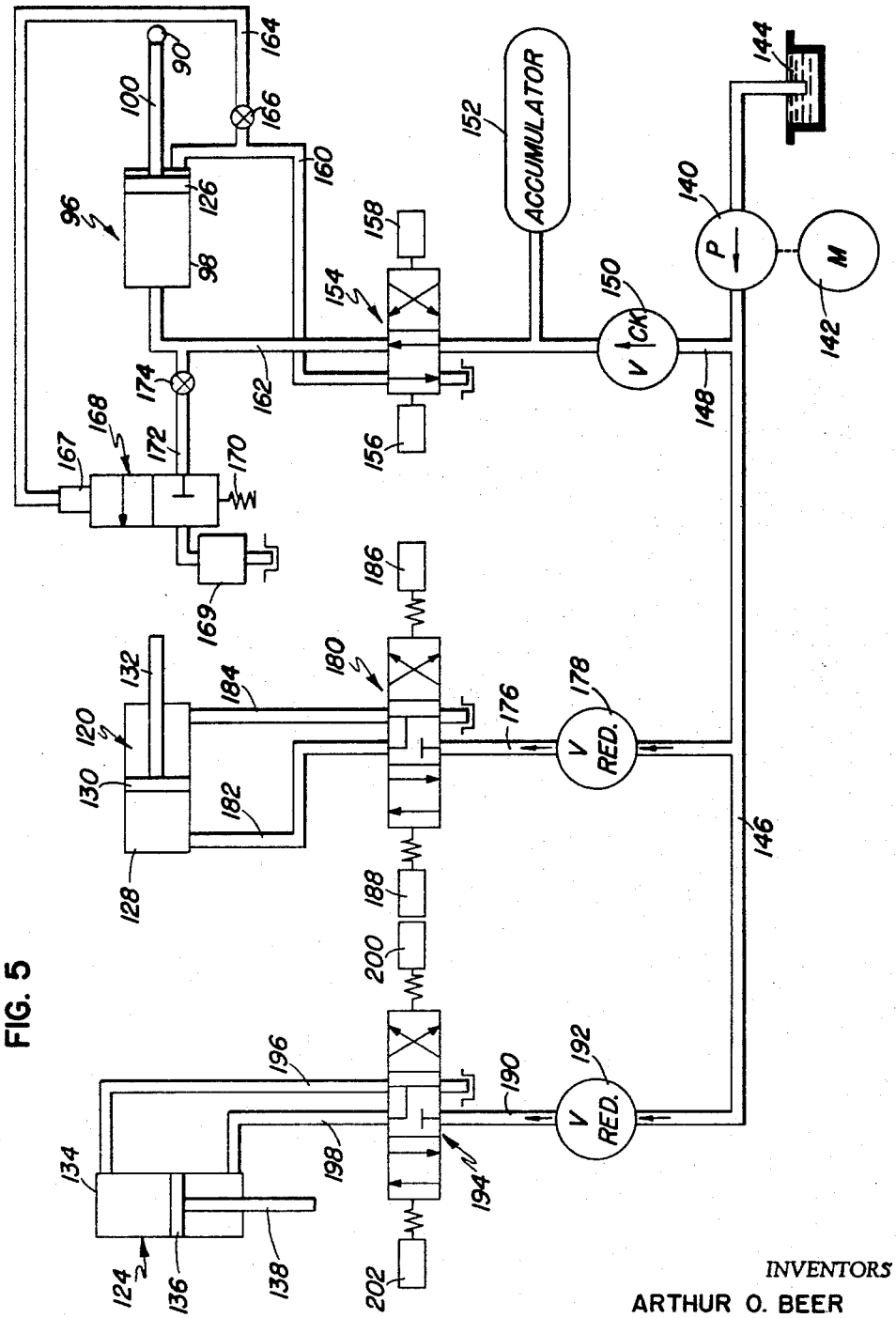
FIG. 5 is a diagram of the hydraulic circuit used in the illustrated preferred embodiment to control certain variables incorporated in the test bed.

Referring now to FIG. 5, the control of fluid motors 96, 120, and 124 will be discussed. As was pointed out above, fluid motor 96 is desirably hydraulic, having a cylinder 98 and a piston rod 100. A piston 126 is shown schematically in FIG. 5. Similarly, motor 120 comprises a cylinder 128, a piston 130, and a piston rod 132; and motor 124 comprises a cylinder 134, a piston 136, and a piston rod 138.

Motors 96, 120, and 124 are supplied with hydraulic fluid under pressure from a pump 140 driven by a suitable motor 142 and taking oil from a tank or reservoir 144. Preferably, the in-line position of pivots 86, 90 and 92 is attained with piston 126 at the extreme right end of its travel as seen in FIG. 5. Pump 140 discharges to a pressure line 146. A branch conduit 148 connects through a check valve 150 with an accumulator 152 and a control valve 154. Valve 154 is a two-position valve and is normally positioned as shown to keep pressure on the head end of motor 96, holding the pivots of linkage 82 in line.

Solenoids 156 and 158 are connected to enable control of valve 154. With the valve spool shifted from its position as shown to the left, oil under pressure will be directed to branch conduit 160 while branch conduit 162 will be connected to tank. Note that a branch conduit 164 is connected, through a shut-off valve 166, with the pilot pressure device 167 of a quick-release valve 168. Valve 168 is a two-position valve; in the position shown, it presents a blocked port and in its other position it presents a port to an auxiliary dump tank 169. A spring 170 biases the valve into the position shown. A branch conduit 172 connects branch conduit 162, through a shut-off valve 174, with valve 168.

Passing now to a consideration of control of motor 120, a branch conduit 176 is provided with a reducing valve 178 and connects pressure line 146 with a three-position valve 180 which is biased into its closed-center position by centering springs as shown. It will be noted that valve 180 is "closed center" from the viewpoint of its pressure port; but the two delivery ports, connected through branch conduits 182 and 184 with the head and rod ends, respectively, of motor 120, are "open center" in that conduits 182 and 184 are connected to tank in the position of the valve shown, so that in this position, motor 120 "floats."

As will be understood by those skilled in the art, valve 180 can be shifted into its other operating positions by means of solenoids 186 and 188.

Similarly, a branch conduit 190 connects, through a reducing valve 192, a valve 194 with pressure line 146. Valve 194 is substantially the same as valve 180. As can be seen, valve 194 connects conduit 190 with motor 124 by way of other branch conduits 196 and 198. Solenoids 200 and 202 are provided to operate valve 194 against the bias of its centering springs.

OPERATION

In some circumstances, it will be desirable to stabilize the test vehicle against lateral "wandering," sometimes called "drift," and to that end the test bed may be, and preferably is, provided with an upright frame member 204. Frame member 204 is provided with an ear 206 for the support of a lateral stabilization link 208 connected in any suitable manner with the frame of the vehicle being tested.

Referring now to FIG. 4, if the test vehicle is to simulate straight-ahead conditions, clutch 44 is disengaged and clutch 30 is engaged. The vehicle being tested, presumably, has four driven wheels. Accordingly, with clutch 30 engaged and clutch 44 disengaged, and with no slip in the belt systems 50, 52, 62 and 64, then the two sides of the test vehicle are driven at the same speed—i.e., straight ahead.

To simulate operation on a curve, it is merely necessary to disengage clutch 30 and engage clutch 44. Then, for a given speed of the electric motor driving the vehicle truck disclosed in Patent 3,244,116 (identified above), the wheels on one side of the vehicle will drive through the two differentials at one speed and the wheels on the other side of the vehicle will drive at another, different, speed, due to the differences in diameters of pulleys 46, 48 on the one hand and pulleys 58, 60 on the other hand. The simulated track curvature can be varied by substituting other pulley diameters for one of the pulley pairs.

To simulate a momentary "dip" in the track, it will only be necessary to drop one rail wheel quickly and restore it to its original elevation quickly. Desirably, with rail wheel 20 at its maximum height, axle portions 32 and 34 will have substantially or approximately coincident axes to simulate a level railroad track.

Referring now to FIG. 5, motor 96 will be actuated to drop rail wheel 20. This is accomplished by shifting the spool of control valve 154 to pressurize branch conduit 160 and vent branch conduit 162 to tank, effecting a sudden shift of piston 126 to the left as seen in FIG. 5. This will collapse the toggle linkage 82 and allow rail wheel 20 to drop.

The foregoing described operation of piston 126 to the left assumes that valves 166 and 174 are closed—and, therefore, assumes a system, in effect, without quick-release valve 168. If the low pressure conduit to the tank is long and offers a high back pressure so as to delay the leftward movement of piston 126, then the system may be provided with an auxiliary dump tank 169, which is a receiver for hydraulic fluid close to cylinder 98, connected by suitable plumbing with tank 144. (Valves 166 and 174 are now assumed to be open.) Discharge of oil from the head end of cylinder 98 then comes more quickly, because high pressure in branch conduit 164 applies pressure to the pilot device of valve 168, quickly opening branch conduits 162 and 172 to the auxiliary dump 169.

With rail wheel 20 momentarily dropped to its lowest point (such as two inches below "level," for example), the vehicle frame is subjected to twisting forces such as might be encountered in actual operations over a soft spot in the terrain supporting one track.

Rail wheel 20 can, if desired, be quickly returned to "level" position by restoring valve 154 to the operating position shown in FIG. 5. It will be noted that motor 96 is subjected to full line pressure, which has built up in accumulator 152, while motors 120 and 124 receive a considerably lesser pressure through reducing valves 178 and 192.

In order better to illustrate the toggle linkage 82 in FIGS. 1 and 2, it is shown just slightly past its dead center position. However, in actual operation, the linkage is never operated past dead center, because that would only delay the dropping action of rail wheel 20. Accordingly, the assembly is adjusted so that pivots 86, 90 and 92 are aligned with piston 126 of motor 96 in its extreme right position of travel.

The operation of motors 120 and 124 will be best understood by reference to FIGS. 3 and 5. Applying pressure to the head end of motor 120 by an appropriate shift of the spool of valve 180 applies a horizontal force to vertical arm 118 at approximately the center of gravity, to simulate centrifugal force in rounding a curve. If the line of force passes through the effective center of pressure of the railway car, motor 120 can simulate a wind load on the side of the car. Whether the side load be a wind load or some other load, its effects on the vehicle can be determined more readily for some studies than with the car actually moving relative to the ground.

Similarly, the effect of all (or a large number) of the passengers on one side of the car can be simulated, as when the train approaches a station and a great many passengers move to the side of the car which will be opened for passenger exit. For that purpose, valve 194 is operated to apply reduced line pressure to the head end of motor 124.

Although the greatest advantages of a test bed made according to this invention are realized in testing a powered railway vehicle, it will be understood that a non-powered truck can also be tested by using a suitable motor in place of the energy absorber. It will be seen from the foregoing that this invention provides means to test a full-scale model of a railway vehicle under closely controlled conditions simulating an actual operating environment. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. A test bed for a railway vehicle having four driven wheels on two parallel axles, comprising:
   four rail wheels rotatably mounted to support said four driven wheels, each railway wheel having a profile that simulates a rail;
   an energy absorber; and
   means drivingly connecting each rail wheel with the energy absorber including means to run the rail wheels on one side at a speed different from the running speed of the rail wheels on the other side.

2. A test bed as in claim 1, and means to rapidly vary the vertical position of one of the rail wheels relative to the other rail wheels to simulate irregularities in the alignment of the track defined by the rails.

3. A test bed as in claim 2, and means to apply a selected load on the vehicle.

4. A test bed as in claim 3, wherein the load applying means includes means to simulate varying conditions encountered in the operation of the vehicle.

5. A test bed for a railway vehicle having four driven wheels on two parallel axles, comprising:
   four rail wheels rotatably mounted to support said four driven wheels,
   each railway wheel having a profile that simulates a rail;
   an energy absorber; and
   means drivingly connecting each rail with the energy absorber, the means including a shaft having drive pulleys of a given diameter connected with the rail wheels on one side, drive pulleys of a different diameter connected with the rail wheels on the other side, and clutch means on such shaft,
   said clutch means being capable of bringing said drive pulleys into operative engagement with respect to each other.

6. A test bed for a railway vehicle having four driven wheels on two parallel axles, comprising:
   four rail wheels rotatably mounted to support said four driven wheels, each rail wheel having a profile that simulates a rail;
   an energy absorber;
   means drivingly connecting each rail wheel with the energy absorber; and
   means to rapidly vary the vertical position of one of the rail wheels relative to the other rail wheels to simulate irregularities in the alignment of the track defined by the rails.

7. A test bed for a railway vehicle having four driven wheels on two parallel axles, comprising:
   four rail wheels rotatably mounted to support said four driven wheels,
   each rail wheel having a profile that simulates a rail;
   an energy absorber;
   means drivingly connecting each rail wheel with the energy absorber; and
   means to apply a selected load on the vehicle structure.

8. A test bed as in claim 7, wherein the load applying means includes means to simulate varying conditions encountered in the operation of the vehicle.

9. A test bed as in claim 8, wherein the simulating means includes a device to apply a horizontal load at a point corresponding to an appropriate center of resistance of the vehicle.

10. A test bed as in claim 8, wherein the simulating means includes a device to apply a vertical load at a point corresponding to one side of the vehicle to simulate an off-center passenger load.

11. A test bed for a railway vehicle comprising:
   a first pair of rail wheels mounted on and rotatable with a two-part axle;
   clutch means releasably connecting the two parts of said axle;
   a second pair of rail wheels rotatable on axes that approach coincidence, one axis being fixed and the other movable;
   means to move the movable axis;
   a two-part shaft;
   second clutch means connecting the two parts of said shaft;

a dynamo connected with one of the parts of the two-part shaft; and means drivably connecting the shaft with each rail wheel.

References Cited

UNITED STATES PATENTS

| | | | |
|---|---|---|---|
| 434,181 | 8/1890 | Foote | 73—117 |
| 2,828,624 | 4/1958 | Bennett | 73—117 |
| 2,709,362 | 5/1955 | Marcus et al. | 73—123 X |
| 3,330,153 | 7/1967 | Perna | 73—116 |

FOREIGN PATENTS 448,220   9/1912   France.

RICHARD C. QUEISSER, *Primary Examiner.*

J. W. MYRACLE, *Assistant Examiner.*